No. 759,898. PATENTED MAY 17, 1904.
A. LOUMAN.
LOCK NUT.
APPLICATION FILED DEC. 29, 1902.
NO MODEL.
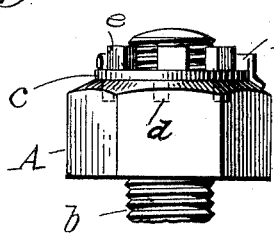
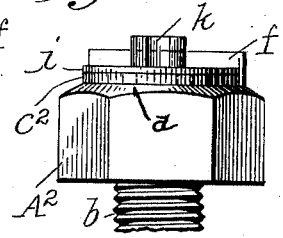
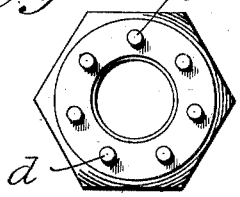
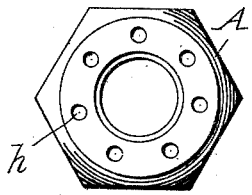
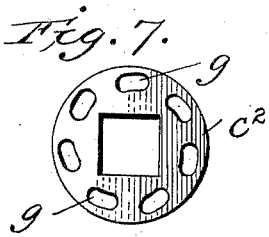
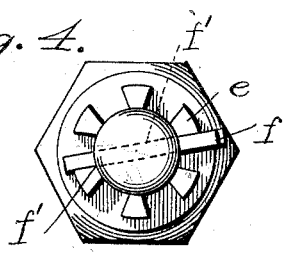
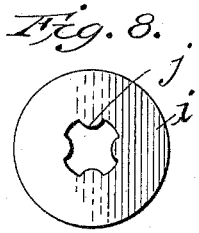
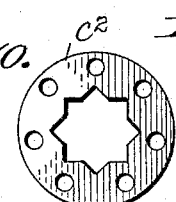
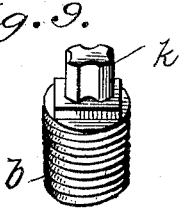
Witnesses
Anna R. McCole
William A. Kelly
Inventor
Andrew Louman
By Edward P. Thompson
Attorney
THE NORRIS PETERS CO., PHOTO-LITHO., WASHINGTON, D. C.

No. 759,898.   
Patented May 17, 1904.

UNITED STATES PATENT OFFICE.

ANDREW LOUMAN, OF EAST HAM, ENGLAND, ASSIGNOR OF ONE-HALF TO ARCHIBALD EDWARD DOBBS, OF LYNNWOOD, REDHILL, ENGLAND.

LOCK-NUT.

SPECIFICATION forming part of Letters Patent No. 759,898, dated May 17, 1904.

Application filed December 29, 1902. Serial No. 137,071. (No model.)

*To all whom it may concern:*

Be it known that I, ANDREW LOUMAN, a subject of the King of Great Britain, and a resident of 1 Sherrard road, Gipsy Lane, East Ham, in the county of Essex, England, have invented a new and useful Improvement in Lock-Nuts, of which the following is a specification.

This invention relates to improvements in means for the fine adjustment and locking of nuts and bolts, axle-fastenings, and other like devices.

The invention has especially for its object to provide a fine adjustment whereby ordinary machine-made parts can be adjusted in any relative position of the engaging parts to any desired degree of accuracy.

The invention consists of elements of construction and relation of parts which will be hereinafter more fully described in the specification and of novel features which will be particularly pointed out in the appended claims.

I have discovered that this can be attained by giving the two locking-surfaces of a locking-washer an unequal number of engaging parts, and this in certain defined combinations. Not all combinations of unequal numbers will effect the object in view, being limited by the fact that the engaging parts of each element must be equidistant from one another, and also the numbers chosen must not be the same nor multiples of one another.

Let us take, by way of example, a screw-nut on a bolt secured by a locking plate or washer, studs on the one part engaging in holes or recesses in the other, and a cotter-pin through the bolt end engaging projections on the upper side of the locking-plate.

Referring to the accompanying figures of the drawings, Figure 1 shows a side elevation of one form comprising a lock-nut for a screw-bolt constructed according to my invention. Fig. 2 is a side elevation of the locking-plate shown in Fig. 1. Fig. 3 is a top view of the nut in Fig. 1. Fig. 4 is a plan view of Fig. 1. Fig. 5 is a side elevation of a modification. Fig. 6 is a plan view of the nut shown in Fig. 5. Fig. 7 is a plan view of the locking-plate of Fig. 5. Fig. 8 is a plan view of the covering-plate shown in Fig. 5. Fig. 9 is a perspective view of the screw end of the bolt. Fig. 10 is another modification of the locking-plate.

Referring first to Figs. 1 to 4, A indicates the nut screwed upon the bolt $b$. When the nut A is accurately set in the precise position required, the locking-plate $c$ is dropped over the end of the bolt $b$ and turned until the studs $d$ engage in the holes $h$ of the nut A. The cotter-pin $f$ is then inserted through the cotter-hole in the bolt end and between the projections $e$ on the top of the locking-plate $c$. The device is thus firmly locked, and the nut cannot move except within the very small proportions, as is evident.

Figs. 5 to 10 show forms of a modification of the above in which the use of a cotter-pin may be avoided by having a shaped bolt end and a correspondingly-shaped aperture in the locking-plate. For instance, the plate $c^2$ may have a square or double square (see Figs. 7 and 10) or other central hole to engage with the bolt-head. The holes or recesses $g$ in the plate are adapted to engage with the pins or studs $d$ in the top of the nut $A^2$. The plate $i$ (shown in Figs. 5 and 8) is a thin cover-plate for the slots in the locking-plate, having projections $j$, adapted to conform to the grooves $k$ in the bolt end, (shown in Figs. 5 and 9,) or the cover-plate and locking-washer may be made with corresponding central apertures. The cotter-pin $f$, (see Fig. 5,) shown as passing through an opening in the screw end of the bolt, is not essential for the purpose of locking the nut, but simply indicated as some means for preventing the locking devices from falling off when the bolt is turned with its head up. It will be noted, as shown in Fig. 7, that the holes $g$ are slightly eccentric with regard to the angles of the central perforations. By this means a finer adjustment is possible, according as the perforated plate is used with one or the other of its sides upward. It is easy by this device to obtain an adjustment to one one-thousandth of a turn of the nut.

Having thus described my invention, what I claim is as follows:

1. A nut-lock consisting of the combination of a bolt, a nut and a locking-washer thereon, a circular row of equidistant studs on the under side of the said washer, means on said nut for engaging with said studs, a circular row of equidistant projections on the upper side of said washer, and means on said bolt for engaging said projections, the numbers of said studs and of said projections being different, neither of the said numbers being a multiple of the other.

2. A nut-lock consisting of the combination of a bolt, a nut thereon, said nut having recesses in its upper side, a locking-washer for said nut, a circular row of equidistant studs on the under side of said washer, said studs entering said recesses, a circular row of equidistant projections on the upper side of said washer, and a cotter-pin passing through the upper end of the said bolt and engaging with the said projections, the numbers of the said projections and of the said studs being different, neither of the said numbers being a multiple of the other.

3. In a nut-lock, a bolt, a nut threaded thereupon, a washer adjacent to the nut and locked thereto by means of a circular row of equidistant engaging devices, a circular row of equidistant projections on the upper face of the washer unequal in number to, and a non-multiple of the said engaging devices and means engaging the bolt and projections.

In testimony whereof I have signed my name to this specification in the presence of two subscribing witnesses.

ANDREW LOUMAN.

Witnesses:
HERBERT SEFTON JONES,
JOHN ALFRED JORDAN.